(12) United States Patent
Yan et al.

(10) Patent No.: US 9,780,695 B2
(45) Date of Patent: Oct. 3, 2017

(54) CONTROL METHOD OF INVERTER CIRCUIT

(71) Applicant: DELTA ELECTRONICS, INC., Taoyuan (TW)

(72) Inventors: Chao Yan, Shanghai (CN); Liping Sun, Shanghai (CN); Dong Xu, Shanghai (CN); Zhihui Ding, Shanghai (CN)

(73) Assignee: DELTA ELECTRONICS, INC., Taoyuan ( * ) Notice: Subject to any disclaimer, the term of this patent is extended or adjusted under 35 U.S.C. 154(b) by 0 days.

(21) Appl. No.: 15/145,610

(22) Filed: May 3, 2016

(65) Prior Publication Data
US 2017/0005592 A1   Jan. 5, 2017

(30) Foreign Application Priority Data
Jul. 3, 2015   (CN) .......................... 2015 1 0386563

(51) Int. Cl.
*H02M 7/5387* (2007.01)
(52) U.S. Cl.
CPC .............................. *H02M 7/53871* (2013.01)
(58) Field of Classification Search
CPC ............. H02M 3/335; H02M 3/33569; H02M 3/33507; H02M 3/3155; H02M 1/32; H02M 7/53871
USPC ......... 363/16, 17, 55, 56.01, 56.02, 95, 131, 363/132
See application file for complete search history.

(56) References Cited

U.S. PATENT DOCUMENTS

| | | | | |
|---|---|---|---|---|
| 6,034,489 A | * | 3/2000 | Weng ................. | H02M 1/4216 315/209 R |
| 2005/0275386 A1 | * | 12/2005 | Jepsen ................ | H02M 7/4807 322/9 |
| 2009/0001923 A1 | * | 1/2009 | Gallegos-Lopez ..... | H02P 21/06 318/801 |
| 2012/0091970 A1 | * | 4/2012 | Cho ........................ | H02J 7/022 320/160 |
| 2012/0126742 A1 | * | 5/2012 | Reggio ............. | H02M 3/33515 320/104 |
| 2013/0033910 A1 | * | 2/2013 | Carletti ................... | H02M 1/42 363/131 |
| 2014/0070614 A1 | * | 3/2014 | Lo ........................... | H02J 3/385 307/43 |
| 2014/0265945 A1 | * | 9/2014 | Deboy ................ | B60L 11/1851 318/139 |

\* cited by examiner

*Primary Examiner* — Adolf Berhane
(74) *Attorney, Agent, or Firm* — Kirton McConkie; Evan R. Witt

(57) ABSTRACT

A control method of an inverter circuit includes the following steps. Firstly, a half cycle of the AC output voltage is divided into a first stage and a second stage. Then, the upper switch element and the lower switch element are controlled to be operated at a first switching frequency lower than a preset threshold frequency in the first stage, so that the inverter circuit is operated in a continuous current mode. Then, the upper switch element or the lower switch element of the bridge arm is controlled to be operated at a second switching frequency in the second stage, so that the upper switch element and the lower switch element are turned on at a preset voltage level and the inverter circuit is operated at a discontinuous current mode boundary mode.

11 Claims, 18 Drawing Sheets

CONTROL METHOD OF INVERTER CIRCUIT

FIELD OF THE INVENTION

The present invention relates to a control method of a power converter, and more particularly to a control method of an inverter circuit.

BACKGROUND OF THE INVENTION

An inverter circuit is one kind of power converter. The inverter circuit is widely applied to an uninterruptible power supply system, a renewable power supply system or a backup power supply system. By alternately changing the on/off states of the switching elements of the inverter circuit, the inverter circuit can convert DC power into AC power.

FIG. 1 is a schematic circuit diagram illustrating a conventional full-bridge inverter circuit. As shown in FIG. 1, the conventional full-bridge inverter circuit 1 receives a DC input voltage Vin, and outputs an AC output voltage Vo and an output current Io. The full-bridge inverter circuit 1 comprises four switch elements S1~S4, an inductor L, four body diodes D1~D4 of the switch elements S1~S4, and four antiparallel diodes D5~D8. The upper switch element S1 and the lower switch element S2 are connected with each other in series to define a first bridge arm. The upper switch element S3 and the lower switch element S4 are connected with each other in series to define a second bridge arm. The node between the upper switch element S1 and the lower switch element S2 of the first bridge arm has a voltage VA. The node between the upper switch element S3 and the lower switch element S4 of the second bridge arm has a voltage VB. The antiparallel diodes D5~D8 are electrically connected with an output terminal of the full-bridge inverter circuit 1 in order to reduce the influence of surge on the load.

FIG. 2 is a schematic waveform diagram illustrating associated signals processed by the conventional full-bridge inverter circuit of FIG. 1 by unipolar modulation. FIG. 3 is a schematic waveform diagram illustrating associated signals processed by the conventional full-bridge inverter circuit of FIG. 1 by bipolar modulation. The full-bridge inverter circuit 1 can be operated by unipolar modulation or bipolar modulation.

As shown in FIG. 2, the full-bridge inverter circuit 1 is operated by unipolar modulation. During the positive half cycle of the AC output voltage Vo, the switch element S1 is turned on, the switch element S2 is turned off, and the switch elements S3 and S4 are alternately turned on and turned off at a high frequency (e.g., higher than 1000 Hz). Meanwhile, the switch element S3 is used as a freewheeling switch element, and the switch element S4 is used as an energy-storage switch element. During the negative half cycle of the AC output voltage Vo, the switch element S1 is turned off, the switch element S2 is turned on, and the switch elements S3 and S4 are alternately turned on and turned off at a high frequency. Meanwhile, the switch element S4 is used as a freewheeling switch element, and the switch element S3 is used as an energy-storage switch element. That is, the magnitude of the AC output voltage Vo is changed between zero and a positive voltage value of the DC input voltage Vin during the positive half cycle, and the magnitude of the AC output voltage Vo is changed between zero and a negative voltage value of the DC input voltage Vin during the negative half cycle.

As shown in FIG. 3, the full-bridge inverter circuit 1 is operated by bipolar modulation. The on/off states of the switch elements S1 and S4 are synchronous, and the on/off states of the switch elements S2 and S3 are synchronous. The switch elements S1 and S2 of the first bridge arms are alternately turned on and turned off, and the switch elements S3 and S4 of the second bridge arms are alternately turned on and turned off. Consequently, the operations of the switch elements S1, S2, S3 and S4 during the positive half cycle of the AC output voltage Vo are respectively identical to the operations of the switch elements S1, S2, S3 and S4 during the negative half cycle of the AC output voltage Vo. In bipolar modulation, the switch elements S1, S2, S3 and S4 are alternately turned on and turned off at a high frequency (e.g., higher than 1000 Hz). That is, the magnitude of the AC output voltage Vo is changed between a positive voltage value and a negative voltage value of the DC input voltage Vin during the positive half cycle or the negative half cycle.

FIG. 4 is a schematic simulated waveform diagram illustrating the output voltage and the output current processed by the conventional full-bridge inverter circuit of FIG. 1 under a light load condition. As mentioned above, the conventional full-bridge inverter circuit 1 is operated at the fixed switching frequency. When the conventional full-bridge inverter circuit is operated under the light load condition, the peak value of the current Io flowing through the inductor L and the backward current corresponding to the peak value of the AC output voltage Vo are larger. Consequently, the turn-on loss and the turn-off loss of the switch elements are increased. Moreover, since the conventional full-bridge inverter circuit 1 is usually operated in a continuous current mode, the switch elements S1, S3 and the switch elements S2, S4 are operated in the hard switch state. Under this circumstance, the switching loss is increased, and the overall efficiency of the conventional full-bridge inverter circuit 1 is reduced. Moreover, some other problems (e.g., generation of switching noise, parasitic oscillation and gate driving interference) possibly occur.

For solving the drawbacks of the conventional full-bridge inverter circuit 1, some approaches are disclosed. An approach uses an additional circuit. Another approach controls the carrier wave or the modulated wave. However, the fabricating cost is increased, and the circuitry design and control mechanism are more complicated.

Therefore, there is a need of provides a control method of an inverter circuit in order to overcome the above drawbacks.

SUMMARY OF THE INVENTION

An object of the present invention provides a control method of an inverter circuit. During a half cycle of the AC output voltage, the upper switch element and the lower switch element of each bridge arm are operated at a first switching frequency in a first stage and operated at a second switching frequency in a second stage. In the first stage, the upper switch element and the lower switch element of the bridge arm are controlled to be operated at the first switching frequency lower than a preset threshold frequency in the first stage. Consequently, the turn-on loss and the turn-off loss of the switch elements are decreased, and the inverter circuit is operated in the CCM mode. In the second stage, the upper switch element or the lower switch element of the bridge arm are controlled to be operated at the second switching frequency. Consequently, the inverter circuit is operated in the DCMB mode. Since the switch elements are operated in the soft switch state, the problem of generating the hard switching loss by the conventional control method will be overcome.

In accordance with an aspect of the present invention, there is provided a control method of an inverter circuit. The inverter circuit includes at least one bridge arm, an inductor and a parasitic capacitor. The bridge arm includes an upper switch element and a lower switch element. The upper switch element and the lower switch element are connected with each other in series. The upper switch element and the lower switch element are alternately turned on and turned off to convert a DC input voltage to an AC output voltage. The control method includes the following steps. Firstly, a half cycle of the AC output voltage is divided into a first stage and a second stage. Then, the upper switch element and the lower switch element of the bridge arm are controlled to be operated at a first switching frequency lower than a preset threshold frequency in the first stage, so that the inverter circuit is operated in a continuous current mode. Then, the upper switch element or the lower switch element of the bridge arm is controlled to be operated at a second switching frequency in the second stage, so that the upper switch element and the lower switch element are turned on at a preset voltage level and the inverter circuit is operated at a discontinuous current mode boundary mode.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a control method for controlling an inverter circuit. The inverter circuit comprises at least one bridge arm, an inductor and a parasitic capacitor. The bridge arm comprises an upper switch element and a lower switch element, which are connected with each other in series. By the control method, the inverter circuit is selectively operated in a continuous current mode (also referred as a CCM mode) or a discontinuous current mode boundary mode (also referred as a DCMB mode). In particular, the half cycle of the AC output voltage is divided into two stages. In the first stage, the upper switch element and the lower switch element of the bridge arm are controlled to be operated at a first switching frequency lower than a preset threshold frequency. Consequently, the turn-on loss and the turn-off loss of the switch elements are decreased, and the inverter circuit is operated in the CCM mode. In the second stage, the upper switch element or the lower switch element of the bridge arm are controlled to be operated at a second switching frequency. Consequently, the upper switch element and the lower switch element are turned on at a preset voltage level and the inverter circuit is operated in the DCMB mode.

Figure 1:
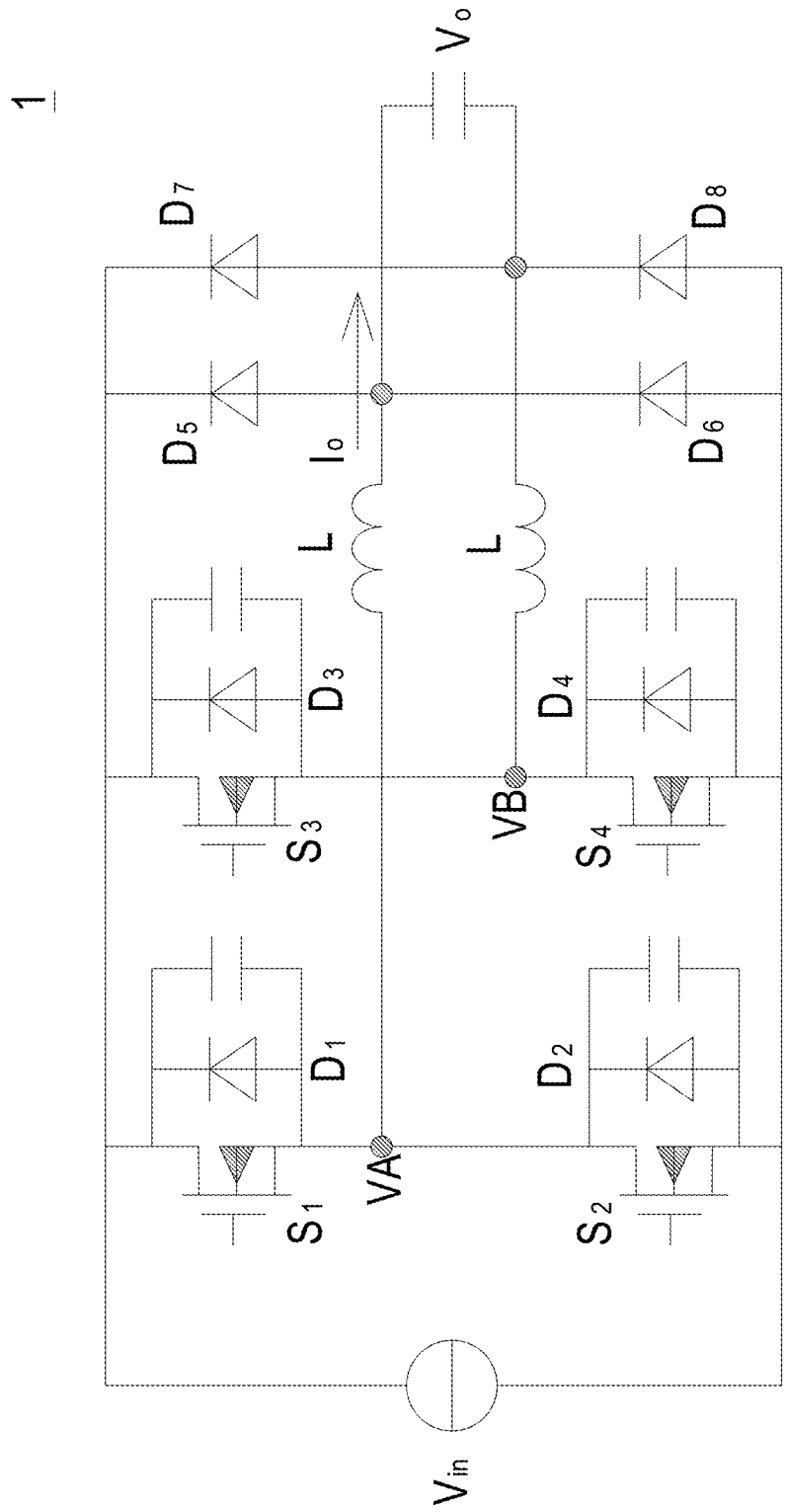
FIG. 1 is a schematic circuit diagram illustrating a conventional full-bridge inverter circuit.
Figure 2:
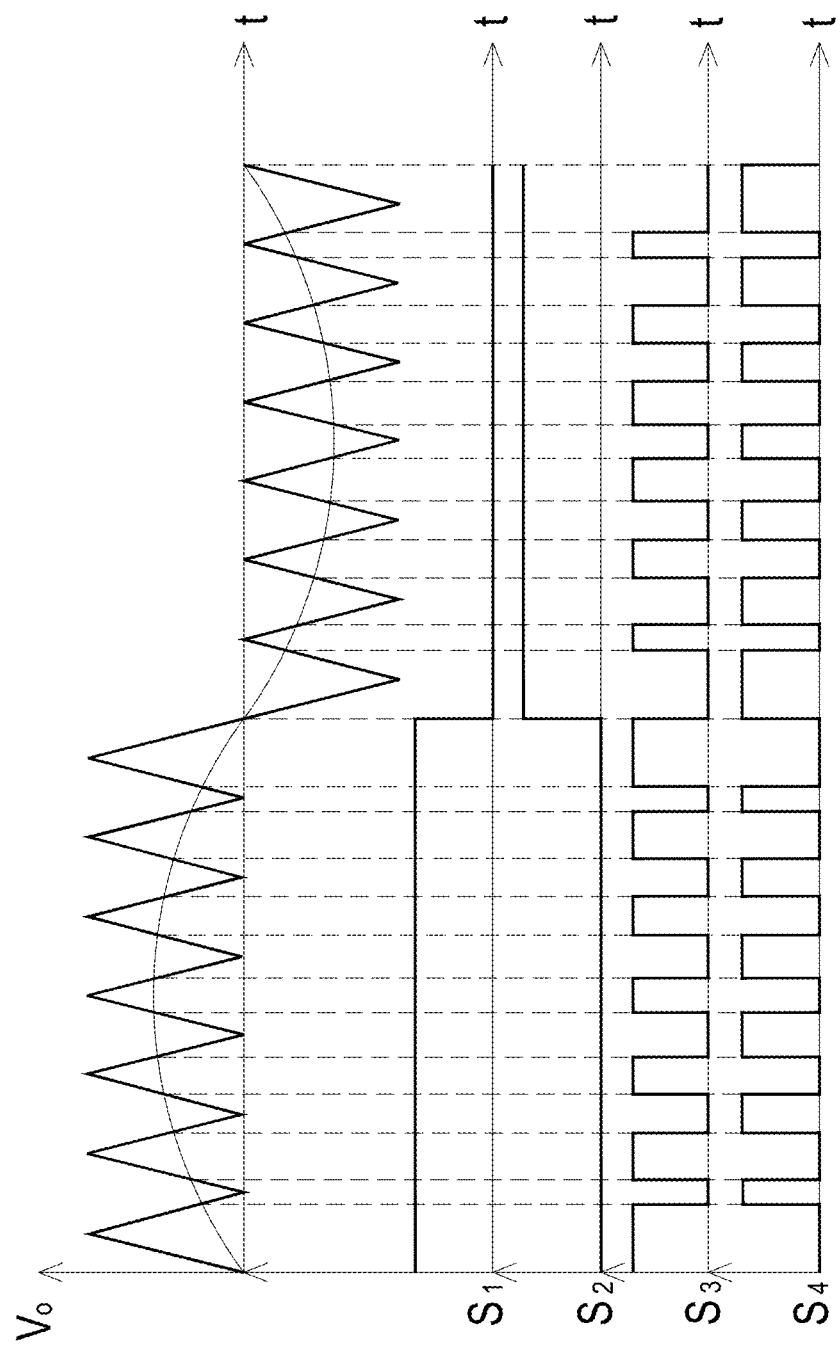
FIG. 2 is a schematic waveform diagram illustrating associated signals processed by the conventional full-bridge inverter circuit of FIG. 1 by unipolar modulation.
Figure 3:
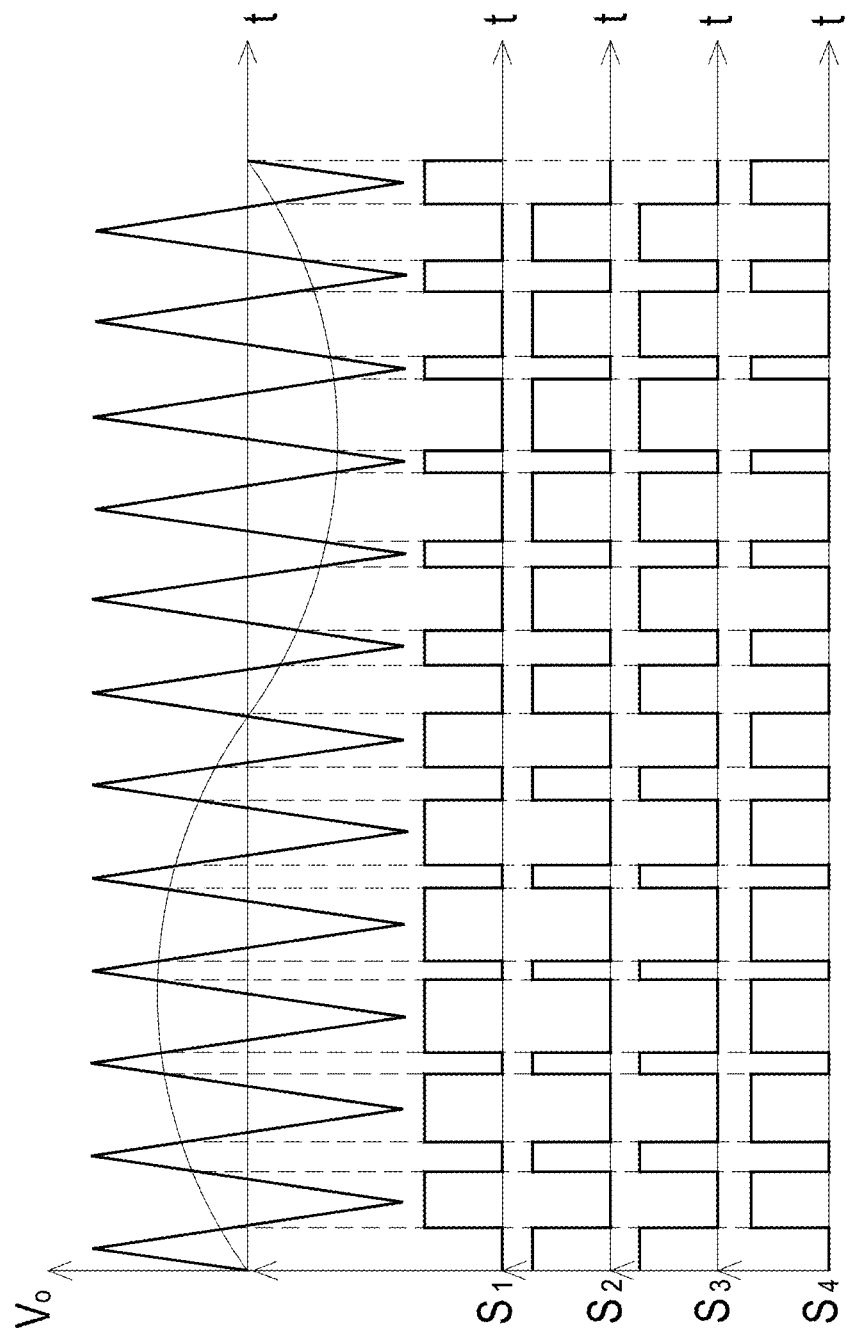
FIG. 3 is a schematic waveform diagram illustrating associated signals processed by the conventional full-bridge inverter circuit of FIG. 1 by bipolar modulation.
Figure 4:
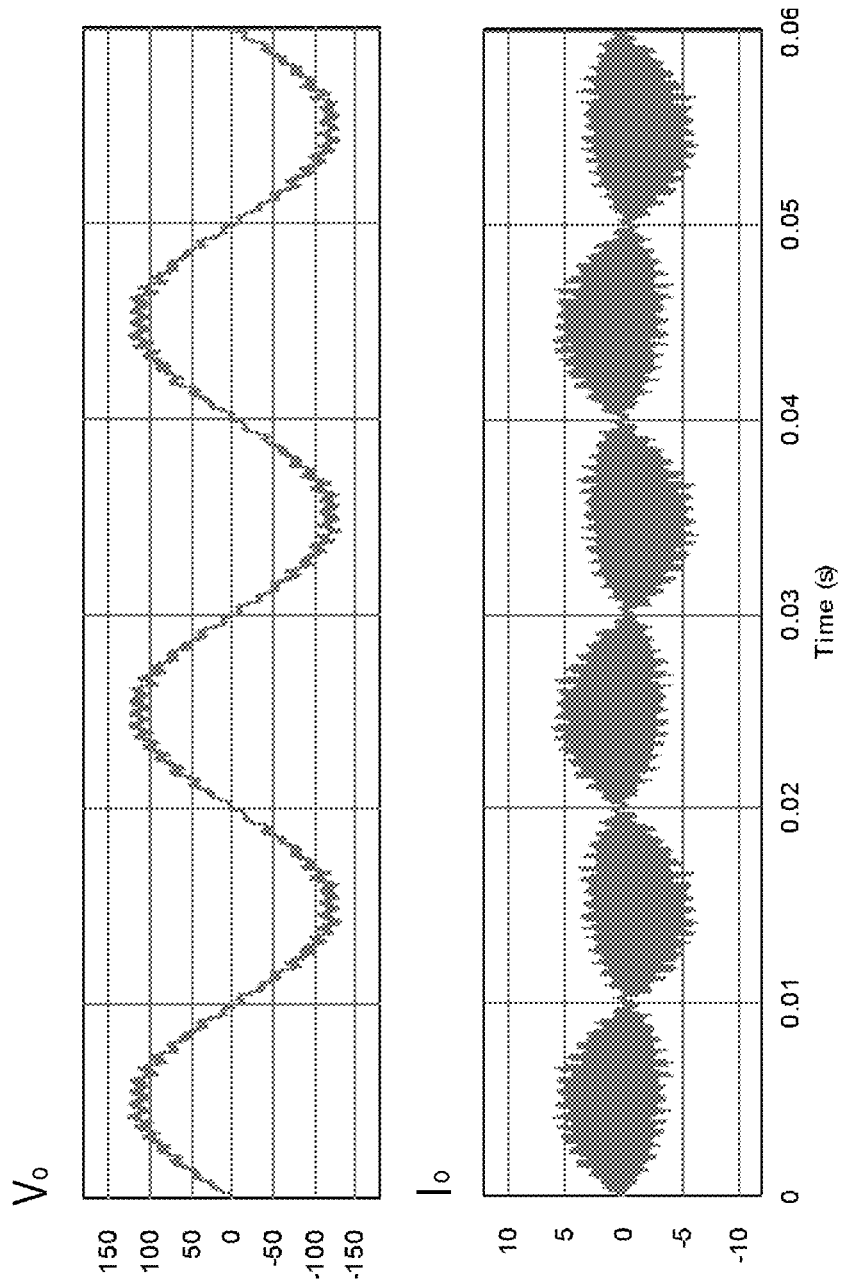
FIG. 4 is a schematic simulated waveform diagram illustrating the output voltage and the output current processed by the conventional full-bridge inverter circuit of FIG. 1 under a light load condition.

The control method of the present invention is used to two switch elements of each bridge arm by unipolar modulation or bipolar modulation. The first stage corresponds to a head region and a tail region of the half cycle of the AC output voltage. In the first stage, the upper switch element and the lower switch element of the bridge arm are controlled to be operated at the first switching frequency lower than the preset threshold frequency in the first stage, and the inverter circuit is operated in the CCM mode. The second stage corresponds to a remaining region of the half cycle of the AC output voltage excluding the head region and the tail region. In the second stage, the inverter circuit is operated in the DCMB mode The control method of the present invention can be applied to the full-bridge inverter circuit 1 of FIG. 1. Preferably but not exclusively, the upper switch element and the lower switch element of the bridge arm of the full-bridge inverter circuit 1 are wide bandgap semiconductors (e.g., GaN). The operations of the full-bridge inverter circuit 1 during the negative half cycle of the AC output voltage Vo are similar to the operations of the full-bridge inverter circuit 1 during the positive half cycle of the AC output voltage Vo, and are not redundantly described herein.

The full-bridge inverter circuit 1 using the control method of the present invention can be operated by unipolar modulation or bipolar modulation. Moreover, the full-bridge inverter circuit 1 is a close-loop system. During the positive half cycle of the AC output voltage Vo, the switch element S1 is turned on, the switch element S3 is used as a freewheeling switch element, and the switch element S4 is used as an energy-storage switch element. During the negative half cycle of the AC output voltage Vo, the switch element S3 is used as an energy-storage switch element, and the switch element S4 is used as a freewheeling switch element. During the positive half cycle of the AC output voltage Vo, the on time Ton of the switch element S3 or the switch element S4 is determined according to the close-loop system. Consequently, the on time Ton is a known value. For allowing the switching frequency of the switch element S3 or the switch element S4 to increase or decrease with the AC output voltage Vo, the DC input voltage Vin and the AC output voltage Vo are sampled. Consequently, the relationships between the DC input voltage Vin, the AC output voltage Vo, the on time Ton and the off time Toff of the switch element S3 or the switch element S4 satisfies the following equation (1):

$$Toff = \frac{Vin - Vo(t)}{Vo(t)} Ton \qquad (1)$$

A switching cycle Ts of the full-bridge inverter circuit 1 satisfies the following equation (2). The switching cycle Ts is the duty cycle of the switch element S3 or the switch element S4. Moreover, the switching frequency is equal to a reciprocal of the switching cycle Ts.

$$Ts = Ton + Toff \qquad (2)$$

Figure 5:
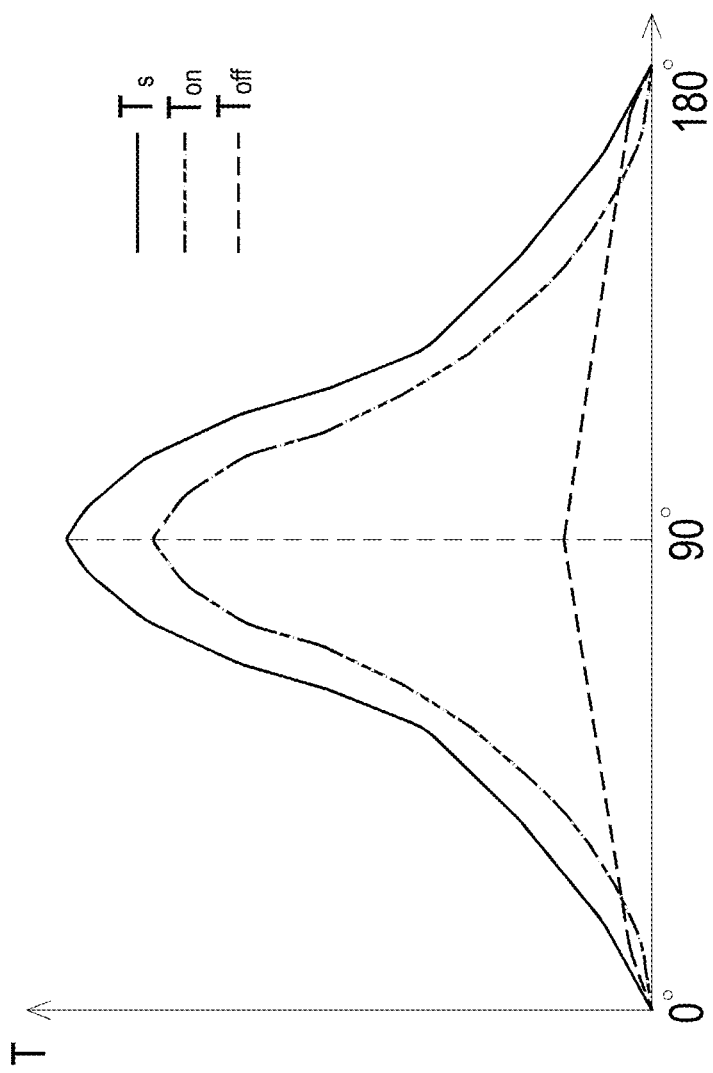
FIG. 5 is a schematic waveform diagram illustrating the relationship between the switching cycle and the phase angle of the full-bridge inverter circuit by unipolar modulation by a control method according to an embodiment of the present invention.

FIG. 5 is a schematic waveform diagram illustrating the relationship between the switching cycle and the phase angle of the full-bridge inverter circuit by unipolar modulation by a control method according to an embodiment of the present invention. According to the above equations (1) and (2), the relationship between the switching cycle Ts or the switching frequency and the phase angle of the full-bridge inverter circuit by unipolar modulation is realized. As shown in FIG. 5, during the positive half cycle of the AC output voltage Vo, the switching cycle Ts gradually increases with the increasing phase angle to the maximum value (at the one-fourth of the switching cycle Ts) and then gradually decreases with the increasing phase angle. The switching frequency is equal to a reciprocal of the switching cycle Ts. Consequently, the switching frequency gradually decreases with the increasing phase angle to the minimum value and then gradually increases with the increasing phase angle.

Figure 6A:
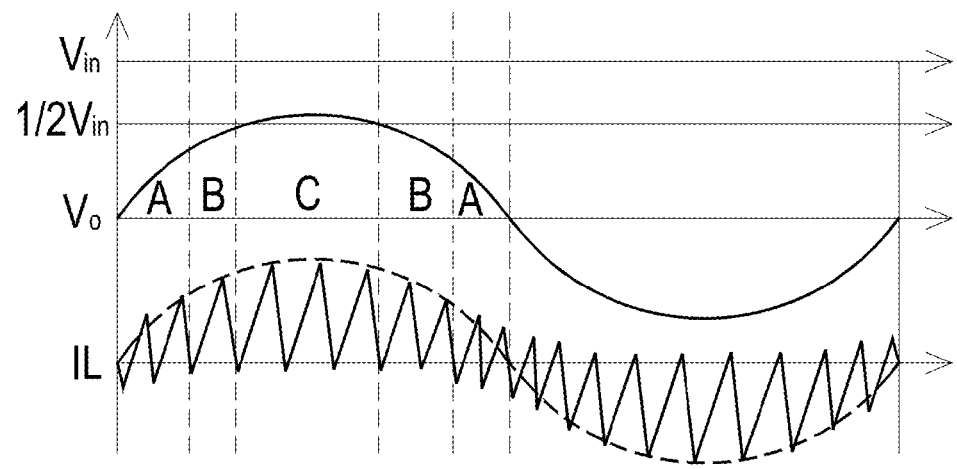
FIG. 6A is a schematic waveform diagram illustrating the input DC voltage, the AC output voltage and the inductor current processed by the full-bridge inverter circuit by unipolar modulation.
Figure 6B:
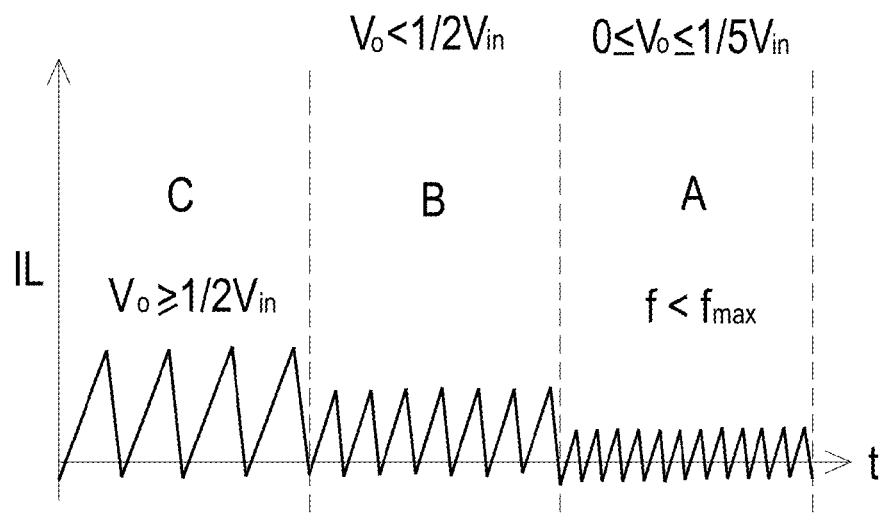
FIG. 6B schematically illustrates the change of the inductor current in different stages during a half cycle.

The stagewise control process of the full-bridge inverter circuit by unipolar modulation will be illustrated with reference to FIGS. 6A and 6B. FIG. 6A is a schematic waveform diagram illustrating the input DC voltage, the AC output voltage and the inductor current processed by the full-bridge inverter circuit by unipolar modulation. FIG. 6B schematically illustrates the change of the inductor current in different stages during a half cycle. As shown in FIG. 6A, the control method of the present invention is implemented with multiple stages A, B and C corresponding to the AC output voltage Vo. The full-bridge inverter circuit 1 is operated in the CCM mode in the stage A, and the full-bridge inverter circuit 1 is operated in the DCMB mode in the stages B and C. In an embodiment, the working mode of the full-bridge inverter circuit 1 is determined according to the inductor current IL that flows through the inductor L. The change of the inductor current IL as shown in FIG. 6B cannot be directly used to judge the working mode. The reason will be illustrated later. Moreover, as shown in FIG. 6A, the stage A corresponds to a head region and a tail region of the half cycle of the AC output voltage Vo, and the stages B and C correspond to the remaining region of the half cycle of the AC output voltage Vo.

In the stage A, the switching frequency of the switch element S3 and the switch element S4 of the bridge arm is lower than a preset threshold frequency. In an embodiment, the preset threshold frequency may be obtained by the following equation (3):

$$fmax = \frac{Tdead * (Vin - Vo\_max)}{4 * L * Cpara * Vin^2} * Vo\_max \qquad (3)$$

In the equation (3), fmax is the preset threshold frequency, Tdead is a dead time between the switch elements of the same bridge arm (e.g., the energy-storage switch element and the freewheeling switch element), Vo_max is the maximum value of the AC output voltage Vo, L is an inductance value of the inductor L, and Cpara is a parasitic capacitance value of the full-bridge inverter circuit 1 (e.g., the junction capacitance of the switch element, the parasitic capacitance of the diode or the parasitic capacitance of the inductor). In one embodiment, the dead time Tdead can be properly extended under the light load condition in order to provide a reverse charge time. According to the equation (3), the preset threshold frequency fmax is related to the DC input voltage Vin and the maximum value of the AC output voltage Vo.

Figure 7:
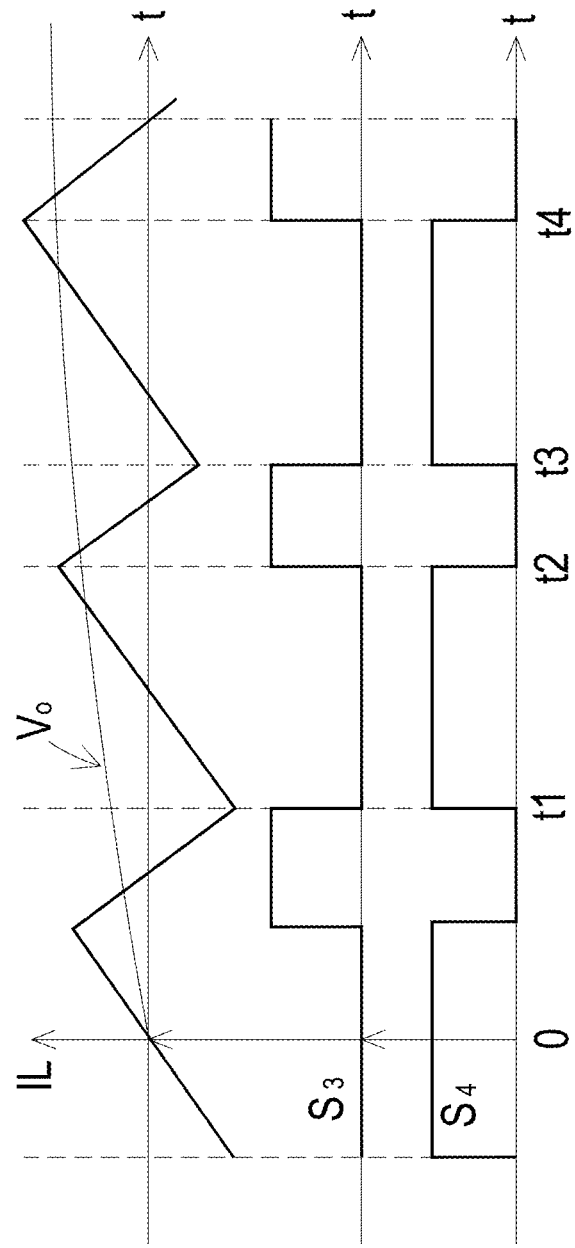
FIG. 7 is a schematic waveform illustrating the inductor current, the AC output voltage Vo in the stage A and the operations of the switch elements S3 and S4.

The waveforms of the associated signals in the stage A will be illustrated with reference to FIG. 7. FIG. 7 is a schematic waveform illustrating the inductor current, the AC output voltage Vo in the stage A and the operations of the switch elements S3 and S4. For simplifying the controlling mechanism of the stage A, the upper switch element and the lower switch element are controlled at a fixed switching frequency. If the deal time Tead in the equation of calculating the preset threshold frequency fmax is properly selected, the inductor L has sufficient reverse current to turn on the switch elements S3 and S4 at a preset voltage level. For example, the preset voltage level is a zero voltage level and the functions of the zero voltage switches are achievable. In the embodiment of FIG. 6B, the AC output voltage Vo satisfies the following condition in the stage A, i.e., 0≤Vo≤⅕Vin. It is noted that the range of the AC output voltage Vo in the stage A is not restricted.

Figure 8:
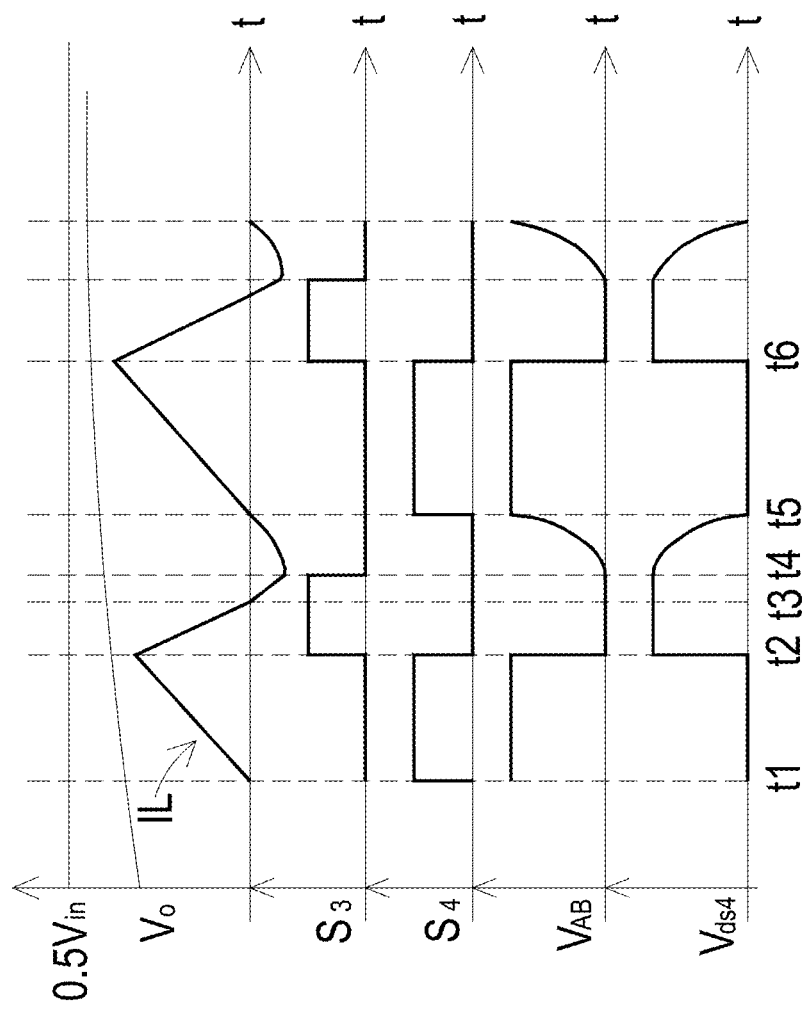
FIG. 8 is a schematic waveform diagram illustrating associated signals of the full-bridge inverter circuit by unipolar modulation in the stage B by the control method according to an embodiment of the present invention.

FIG. 8 is a schematic waveform diagram illustrating associated signals of the full-bridge inverter circuit by unipolar modulation in the stage B by the control method according to an embodiment of the present invention. In the embodiment of FIG. 6B, the AC output voltage Vo satisfies the following condition in the stage B, i.e., Vo<½Vin. In the stage B, the on state of the switch element S3 (i.e., a freewheeling switch element) is extended for a first set time ΔT. In the extended time period, the resonance of the inductor L and the parasitic capacitor Cpara allows the switch element S4 to be turned on at the preset voltage level. Consequently, the full-bridge inverter circuit 1 is operated in the DCMB mode.

Please refer to FIG. 8 again. In the time interval between t1 and t2, the switch element S1 is continuously turned on (not shown), the switch element S2 is continuously turned off (not shown), the switch element S3 is turned off, and the switch element S4 is turned on. Meanwhile, the inductor L is forwardly charged by the DC input voltage Vin. Consequently, the inductor current IL flowing through the inductor L rises linearly to provide electric energy to the load.

In the time interval between t2 and t3, the switch element S1 is continuously turned on (not shown), the switch element S2 is continuously turned off (not shown), the switch element S3 is turned on, and the switch element S4 is turned off. At the time point t2, the inductor current IL flowing through the inductor L reaches the maximum value. After the time point t2, the inductor current IL gradually decreases.

In the time interval between t3 and t4, the switch element S1 is continuously turned on (not shown), and the switch element S2 is continuously turned off (not shown). At the time point t3, the inductor current IL is zero. If the switch element S3 is turned off at this moment, the resonance of the inductor L and the parasitic capacitor Cpara occurs. Due to the resonance, the energy accumulated in the inductor L is insufficient to reduce the voltage of the switch element S4 to the preset voltage level. In this embodiment, the on state of the switch element S3 is extended for the first set time ΔT, which is equal to the time interval between t3 and t4. Under this circumstance, the inductor L has the sufficient reverse charge current. Consequently, in the time interval between time t4 and t5, the resonance of the inductor L and the parasitic capacitor Cpara can reduce the voltage of the switch element S4 to the preset voltage level. In this embodiment, the first set time ΔT satisfies the following equation (4):

$$\Delta T \geq \frac{1}{\omega} \sqrt{\frac{(Vin - Vset - Vo)^2}{Vo^2} - 1} \quad (4)$$

$$\omega = 1/\sqrt{L \cdot C_{para}}$$

In the equation (4), L is the inductance value of the inductor L, Cpara is a parasitic capacitance value of the full-bridge inverter circuit 1 (e.g., the junction capacitance of the switch element, the parasitic capacitance of the diode or the parasitic capacitance of the inductor), and Vset is an expected set voltage across both ends of the switch element S4 while being switched from the off state to the on state. Since the on state of the switch element S3 is extended for the first set time ΔT, the load connected with the output terminal of the full-bridge inverter circuit 1 is reversely charged within the first set time ΔT. Meanwhile, the inductor current IL flowing through the inductor L satisfies the following equation (5):

$$IL(t) = -\frac{Vo}{L}t \quad (5)$$

In the time interval between t4 and t5, the switch element S1 is continuously turned on (not shown), the switch element S2 is continuously turned off (not shown), the switch element S3 is switched from the on state to the off state, and the switch element S4 is turned off. When the switch element S3 is turned off, the resonance of the inductor L and the parasitic capacitor Cpara allows the inductor current IL to gradually change from the negative value to zero. Moreover, the voltage Vds4 across the two ends of the switch element S4 gradually decreases to zero. Alternatively, in another embodiment, the time interval between t3 and t4 is shortened to reduce the voltage across the two ends of the switch element S4 to the preset voltage level. As the voltage across the two ends of the switch element S4 decreases, the voltage difference VAB between the voltage A and the voltage B also gradually increases. Meanwhile, the inductor current IL flowing through the inductor L satisfies the following equation (6):

$$IL(t) = \frac{-V_o \cdot \sin(\omega t)}{\omega L} + \frac{-Vo}{L} \cdot \Delta T \cdot \cos(\omega t) \quad (6)$$

After the on state of the switch element S3 is switched to the off state (i.e., after t4), the resonance of the inductor L and the parasitic capacitor Cpara allows the inductor current IL to gradually change from the negative value to zero. In this embodiment, after the off state of the switch element S3 and then extend for a second set time ΔT2, the off state of the switch element S4 is switched to the on state. Consequently, the inductor current IL flowing through the inductor L gradually changes from the negative value to zero within the second set time ΔT2. As shown in FIG. 8, the second set time ΔT2 is equal to the time interval between t4 and t5. The second set time ΔT2 satisfies the following equation (7):

$$\Delta T2 = \frac{\pi - \arctan(\Delta T \cdot \omega)}{\omega} \quad (7)$$

In the time interval between the t5 and t6, the switch element S1 is continuously turned on (not shown), the switch element S2 is continuously turned off (not shown), and the switch element S3 is turned off. At the time point t5, the inductor current IL is zero, and the voltage across the two ends of the switch element S4 is discharged to zero. Consequently, the switch element S4 is switched from the off state to the on state under the zero voltage condition. After the time point t6, the next switching cycle appears. By the way, the dead time of the switch element S3 and the dead time of the switch element S4 are not shown.

In the equation (4) of calculating the first set time ΔT, the first set time ΔT is obtained when the AC output voltage Vo is smaller than one half of the DC input voltage Vin in the stage B (i.e., Vo<½Vin). Since the on state of the switch element S3 is extended for the first set time ΔT, the inductor L is reversely charged. Consequently, the voltage across the two ends of the switch element S4 is reduced to the preset voltage level within the subsequent resonant time period.

Figure 9:
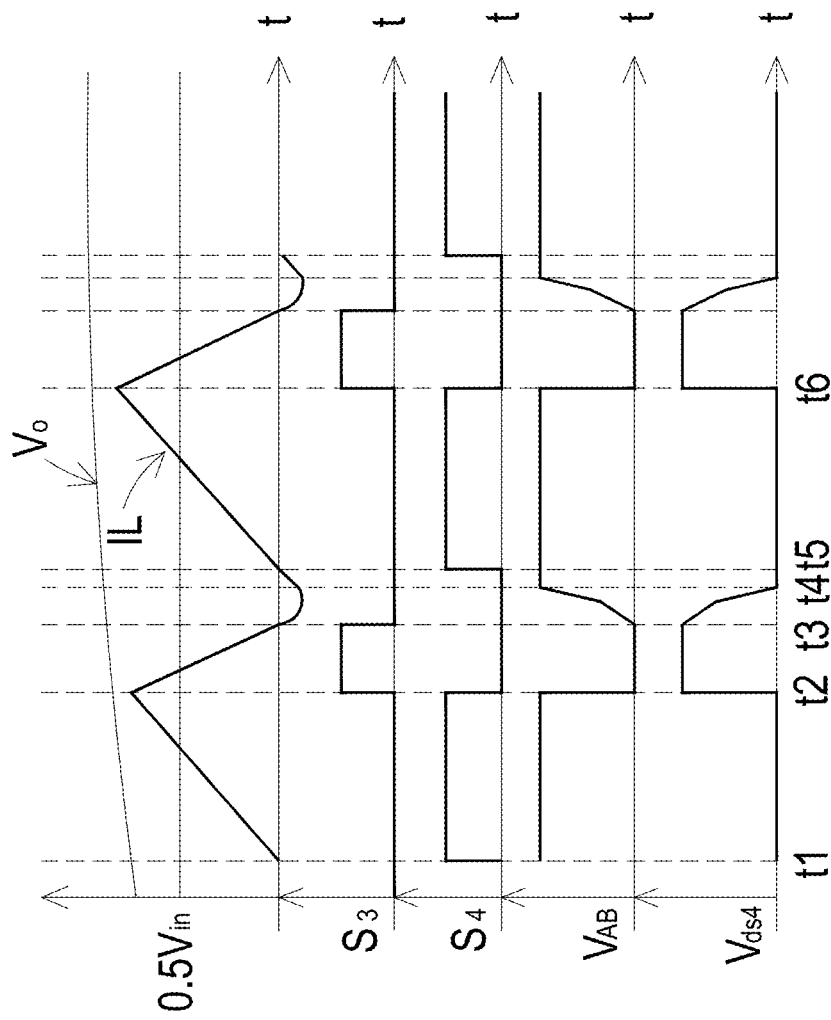
FIG. 9 is a schematic waveform diagram illustrating associated signals of the full-bridge inverter circuit by unipolar modulation in the stage C by the control method according to an embodiment of the present invention.

FIG. 9 is a schematic waveform diagram illustrating associated signals of the full-bridge inverter circuit by unipolar modulation in the stage C by the control method according to an embodiment of the present invention. In the embodiment of FIG. 6B, the AC output voltage Vo satisfies the following condition in the stage C, i.e., Vo≥½Vin. The operations of the switch elements within the time interval between t1 and t2 and the time interval between t2 and t3 in the stage C (see FIG. 9) are similar to the operations of the switch elements within the time interval between t1 and t2 and the time interval between t2 and t3 in the stage B (see FIG. 8), and are not redundantly described herein. Please refer to FIG. 9 again. In the time interval between t3 and t4, both of the switch elements S3 and S4 are turned off. Consequently, the resonance of the inductor L and the parasitic capacitor Cpara allows the inductor L to be reversely charged. Consequently, the relationship between the voltage Vds3 across the two ends of the switch element S3 and the inductor current IL flowing through the inductor L satisfies the following equation (8):

$$\begin{cases} IL(t) = \dfrac{-Vo \cdot \mathrm{Sin}(\omega t)}{\omega L} \\ Vds3(t) = (0 - \cos(\omega t))Vo + Vo \end{cases} \quad (8)$$

Due to the resonance, the voltage across the two ends of the switch element S3 can be charged to the DC input voltage Vin, and the voltage Vds4 across the two ends of the switch element S4 can be discharged to zero. In this embodiment, after the switch element S3 is turned off (i.e., at the time point t3) for a resonant time period ΔT3, the voltage Vds4 across the two ends of the switch element S4 is discharged to zero and clamped by the body diode D4 of the switch element S4. Consequently, after the time point t3, the voltage difference VAB between the voltage A and the voltage B gradually increases. Under this circumstance, the resonant time period ΔT3 satisfies the following equation (9):

$$\Delta T3 = \dfrac{\arccos\left(1 - \dfrac{Vin}{Vo}\right)}{\omega} \quad (9)$$

At the time point t4, the voltage across the two ends of the switch element S4 is discharged to zero. Since the reverse inductor current IL flowing the inductor L exists, the switch element S4 is turned on after the reverse inductor current IL is changed to zero. Consequently, after a discharge time period Tdelay, the off state of the switch element S4 is switched to the on state. The discharge time period Tdelay satisfies the following equation (10).

$$Tdelay = \dfrac{IL \cdot \sin(w \cdot \Delta T3)}{Vin - Vo} L \quad (10)$$

The operations of the full-bridge inverter circuit 1 by unipolar modulation have been described as above. In the stage A, the switch element S3 and the switch element S4 are operated at a first switching frequency lower than the preset threshold frequency fmax. In the stage B, the on state of the switch element S3 is extended for the first set time ΔT. Under this circumstance, the inductor L is reversely charged. Consequently, the resonance of the inductor L and the parasitic capacitor Cpara allows the switch element S4 to be turned on at the preset voltage level Vset. Preferably but not exclusively, the preset voltage level is a zero voltage level. In the stage B, the switching cycle Ts satisfies the following equation (11):

$$Ts = Ton + Toff + Tdead + \Delta T1 + \Delta T2 \quad (11)$$

In the equation (11), Tdead is the dead time between the energy-storage switch element S4 and the freewheeling switch element S3 of the same bridge arm. The dead time Tdead can be previously determined. In the stage C, the output current To from the full-bridge inverter circuit 1 is operated in the DCMB mode. The resonance of the inductor L and the parasitic capacitor Cpara occurs and the switch element S4 is discharged so that the voltage between the drain electrode and the source electrode of the switch element S4 is clamped to zero. Consequently, the switch element S4 is turned on at the preset voltage level Vset. In the stage C, the switching cycle satisfies the following equation (12):

$$Ts = Ton + Toff + Tdead + \Delta T3 + Tdelay \quad (12)$$

From the above descriptions, the resonance of the inductor L and the parasitic capacitor Cpara occurs in the stage B and in the stage C. Consequently, the waveform of the inductor current in the stage B or C is different from the waveform of the inductor current in the stage A. The full-bridge inverter circuit 1 is operated in the CCM mode in the stage A, and the full-bridge inverter circuit 1 is operated in the DCMB mode in the stages B and C. In the stage A, the switching frequency of the switch element is lower than the preset threshold frequency. In the stages B and C, the full-bridge inverter circuit 1 is operated in the DCMB mode to realize the soft switch state. Moreover, the AC output voltage Vo is sampled by the control method of the present invention. As the AC output voltage Vo increases, the on time of the switch element increases. As the AC output voltage Vo decreases, the on time of the switch element decreases. Consequently, the switching frequency in the stage C is lower than the switching frequency in the stage B.

The operations of the full-bridge inverter circuit 1 during the negative half cycle of the AC output voltage Vo are similar to the operations of the full-bridge inverter circuit 1 during the positive half cycle of the AC output voltage Vo, and are not redundantly described herein. Moreover, by bipolar modulation, the on time Ton of each switch element of the full-bridge inverter circuit 1 is determined according to the close-loop system and therefore the on time Ton is a known value. For allowing the switching frequency of the switch element to increase or decrease with the AC output voltage Vo, the DC input voltage Vin and the AC output voltage Vo are sampled. Consequently, the relationships between the DC input voltage Vin, the AC output voltage Vo, the on time Ton and the off time Toff of the switch element satisfies the following equation (13):

$$Toff = \dfrac{Vin - Vo(t)}{Vin + Vo(t)} Ton \quad (13)$$

According to the formula (13), a switching cycle Ts' of the full-bridge inverter circuit 1 satisfies the following equation (14). The switching cycle Ts' is the duty cycle of the switch element. Moreover, the switching frequency is equal to a reciprocal of the switching cycle Ts'.

$$Ts'=Ton+Toff \quad (14)$$

Figure 10:
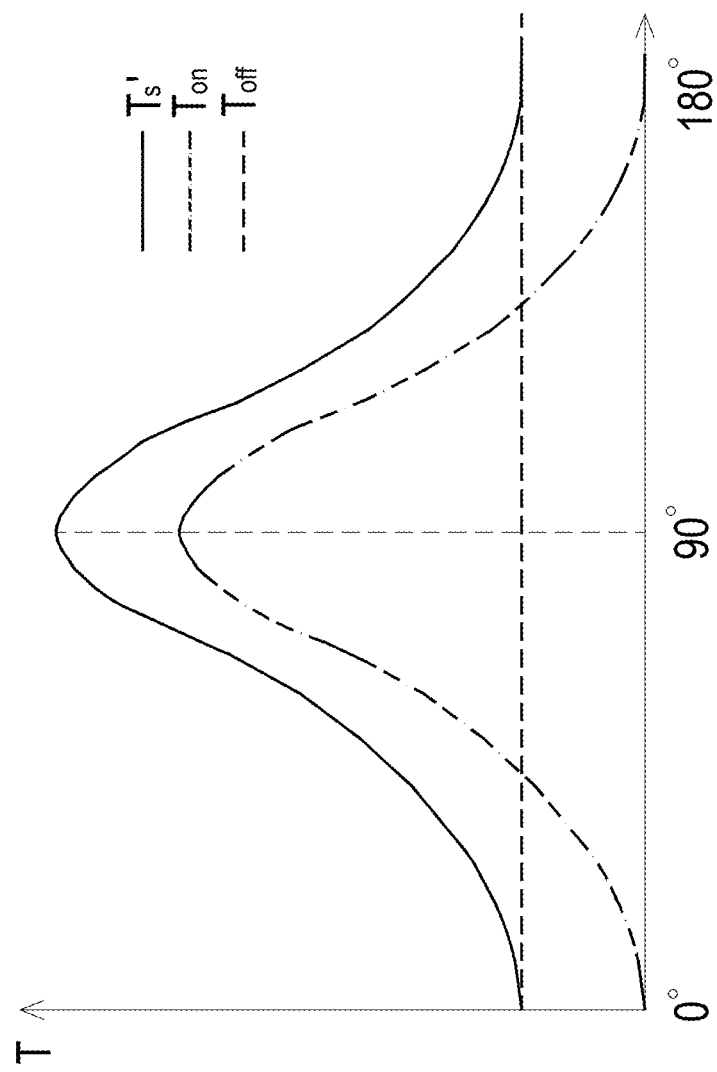
FIG. 10 is a schematic waveform diagram illustrating the relationship between the switching cycle and the phase angle of the full-bridge inverter circuit by bipolar modulation by the control method according to the embodiment of the present invention.

FIG. 10 is a schematic waveform diagram illustrating the relationship between the switching cycle and the phase angle of the full-bridge inverter circuit by bipolar modulation by the control method according to the embodiment of the present invention. According to the above equations (13) and (14), the relationship between the switching cycle Ts' (or the switching frequency) and the phase angle of the full-bridge inverter circuit by bipolar modulation is realized. As shown in FIG. 10, the off time of the switch element is constant. However, the changes of the on time Ton and the switching cycle Ts' corresponding to bipolar modulation are similar to the changes of the on time Ton and the switching cycle Ts corresponding to unipolar modulation (see FIG. 5). In other words, the operations of bipolar modulation of the control method are partially similar to the operations of unipolar modulation of the control method.

Figure 11A:
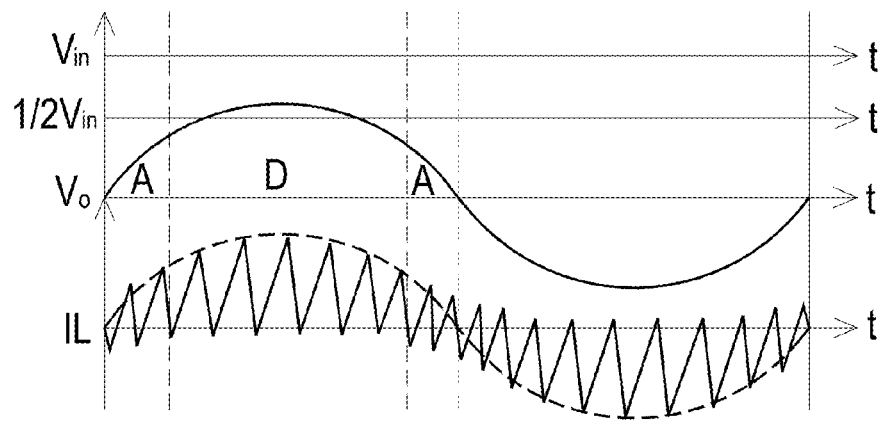
FIG. 11A is a schematic waveform diagram illustrating the input DC voltage, the AC output voltage and the inductor current processed by the full-bridge inverter circuit by bipolar modulation.
Figure 11B:
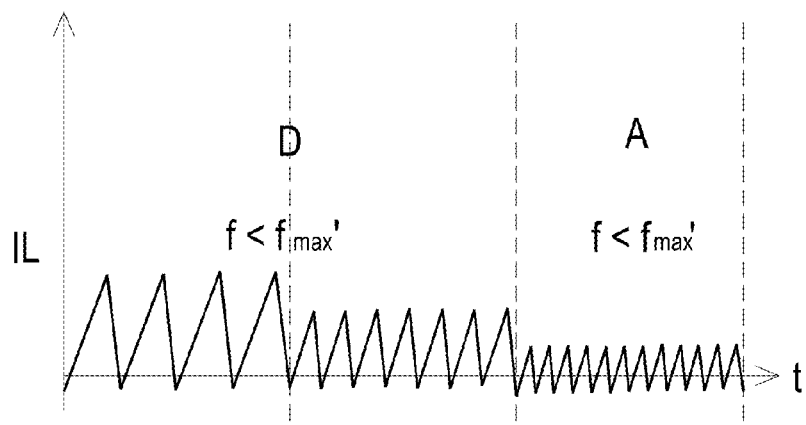
FIG. 11B schematically illustrates the change of the inductor current in different stages during a half cycle.

The stagewise control mechanism of the full-bridge inverter circuit by bipolar modulation will be illustrated with reference to FIGS. 11A and 11B. FIG. 11A is a schematic waveform diagram illustrating the input DC voltage, the AC output voltage and the inductor current processed by the full-bridge inverter circuit by bipolar modulation. FIG. 11B schematically illustrates the change of the inductor current in different stages during a half cycle. As shown in FIG. 11A, the control method of the present invention is implemented with two stages A and D corresponding to the AC output voltage Vo. The full-bridge inverter circuit 1 is operated in the CCM mode in the stage A, and the full-bridge inverter circuit 1 is operated in the DCMB mode in the stage D. In an embodiment, the working mode of the full-bridge inverter circuit 1 is determined according to the inductor current IL that flows through the inductor L. Moreover, as shown in FIG. 11A, the stage A corresponds to a head region and a tail region of the half cycle of the AC output voltage Vo, and the stage D corresponds to the remaining region of the half cycle of the AC output voltage Vo. The change of the inductor current IL as shown in FIG. 11B cannot be directly used to judge the working mode. The reason will be illustrated later.

FIG. 11B clearly shows the changes of the working frequencies of the full-bridge inverter circuit 1 in different stages. As the AC output voltage Vo decreases, the working frequency of the stage D closer to the stage A corresponding to the end region of the half cycle of the AC output voltage Vo gradually increases. In other words, the working frequency of the full-bridge inverter circuit 1 in the stage A is higher than the working frequency of the full-bridge inverter circuit 1 in the stage D. In the stage A, the switching frequency of the switch element of each bridge arm is lower than the preset threshold frequency. Consequently, the turn-on loss and the turn-off loss of the switch element in the stage A are decreased. In an embodiment, the preset threshold frequency may be obtained by the following equation (15):

$$fmax' = \frac{Tdead*(Vin^2 - Vo\_max^2)}{8*L*Cpara*Vin^2} \quad (15)$$

In the equation (15), fmax' is the preset threshold frequency, Tdead is a dead time between the switch elements of the same bridge arm (e.g., the energy-storage switch element and the freewheeling switch element), Vo_max is the maximum value of the AC output voltage Vo, L is an inductance value of the inductor L, and Cpara is a parasitic capacitance value of the full-bridge inverter circuit 1 (e.g., the junction capacitance of the switch element, the parasitic capacitance of the diode or the parasitic capacitance of the inductor). The dead time Tdead can be properly extended under the light load condition in order to provide a reverse charge time. According to the equation (15), the preset threshold frequency fmax' is related to the DC input voltage Vin and the maximum value of the AC output.

Figure 12:
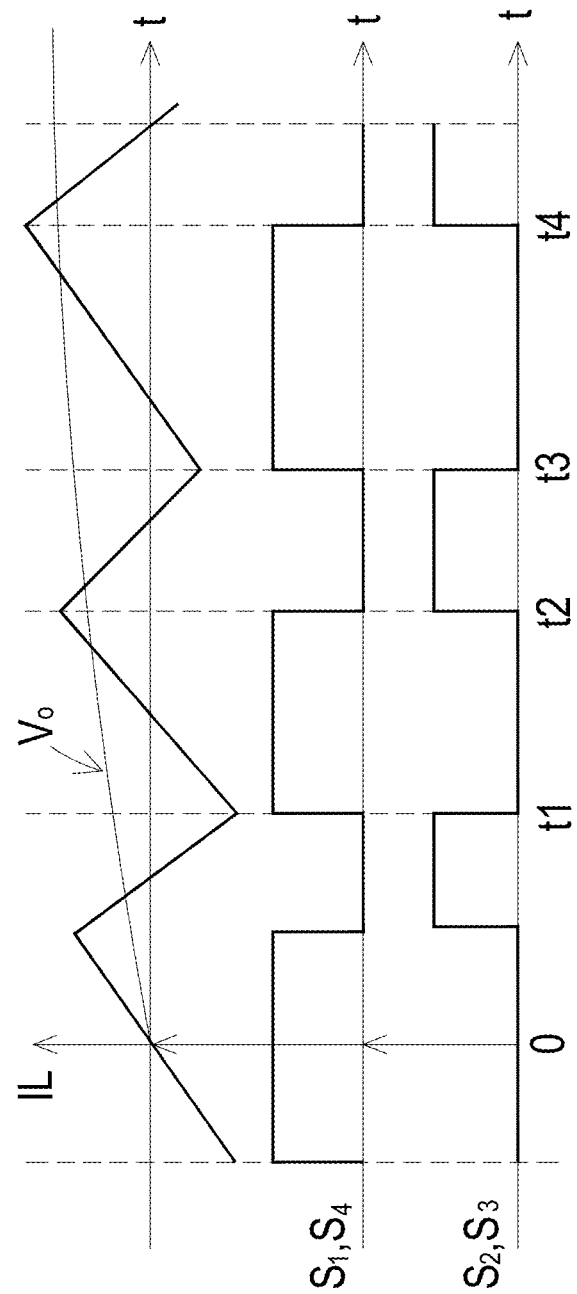
FIG. 12 is a schematic waveform illustrating the inductor current, the AC output voltage Vo in the stage A and the operations of the switch elements.

The waveforms of the associated signals in the stage A will be illustrated with reference to FIG. 12. FIG. 12 is a schematic waveform illustrating the inductor current, the AC output voltage Vo in the stage A and the operations of the switch elements. For simplifying the controlling mechanism of the stage A, the upper switch element and the lower switch element are controlled at a fixed switching frequency. If the deal time Tead in the equation of calculating the preset threshold frequency fmax' is properly selected, the inductor L has sufficient reverse current to turn on the switch elements and S4 at the preset voltage level. For example, the preset voltage level is a zero voltage level and the functions of the zero voltage switches are achievable. According to the waveform of the inductor current IL, the full-bridge inverter circuit 1 is operated in the CCM mode in the stage A. In addition, the waveform of the inductor current IL does not contain the resonant current. In the embodiment of FIG. 11B, the stage A corresponds to the head region and the tail region of the half cycle of the AC output voltage Vo. It is noted that boundary between the stage A and the stage D may be varied according to the practical requirements of the inverter circuit.

Figure 13:
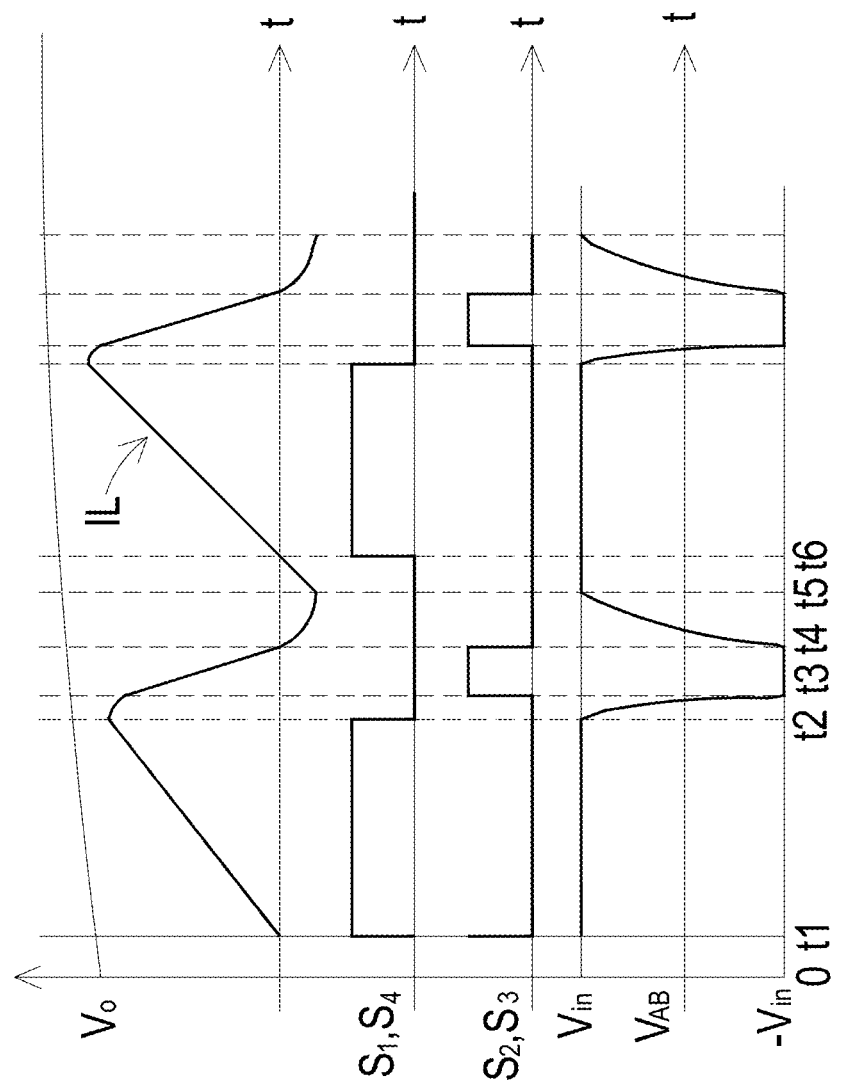
FIG. 13 is a schematic waveform diagram illustrating associated signals of the full-bridge inverter circuit by bipolar modulation in the stage D by the control method according to the embodiment of the present invention.

FIG. 13 is a schematic waveform diagram illustrating associated signals of the full-bridge inverter circuit by bipolar modulation in the stage D by the control method according to the embodiment of the present invention. As mentioned above, the stage A corresponds to the head region and the tail region of the half cycle of the AC output voltage Vo, and the stage D corresponds to the remaining region of the half cycle of the AC output voltage Vo. In the stage D, the switch elements of each bridge arm are operated at a second switching frequency lower than the preset threshold frequency fmax'. Moreover, the on time and the off time of each switch element are determined according to the equations (13) and (14). By bipolar modulation, the switch elements S1 and S4 are synchronously turned on or turned off, and the switch elements S2 and S3 are synchronously turned on or turned off.

Please refer to FIG. 13 again. In the time interval between t1 and t2, the switch elements S1 and S4 are turned on, and the switch elements S2 and S3 are turned off. Meanwhile, the inductor L is forwardly charged by the DC input voltage Vin. Consequently, the inductor current IL flowing through the inductor L rises linearly to provide electric energy to the load. In the time interval between t2 and t3, the switch elements S1 and S4 are turned off, and the switch elements S2 and S3 are turned off. At the time point t2, the inductor current IL flowing through the inductor L reaches the maximum value. Since all of the switch elements S1, S4, S2 and S3 are turned off, the time interval between t2 and t3 is a dead time Tdead. Since the inductor current IL rises to the maximum value at the time point t2, the voltage difference VAB between the voltage A and the voltage B quickly decreases from the DC input voltage Vin to zero during the deal time Tdead. Within the dead time Tdead, the voltage difference VAB is reversely increased to the negative value and clamped. Consequently, the functions of the zero voltage switches of the switch elements S2 and S3 are achievable. In the time interval between t3 and t4, the switch elements S1 and S4 are turned off, and the switch elements S2 and S3 are turned on. Consequently, the functions of the zero voltage switches of the switch elements S2 and S3 are achievable. In addition, the inductor current IL flowing through the inductor L decreases from the positive value to zero.

In the time interval between t4 and t5, all of the switch elements S1, S4, S2 and S3 are turned off. Meanwhile, the resonance of the inductor L and the parasitic capacitor Cpara occurs. Consequently, the inductor L is reversely charged, and the negative value of the inductor current IL gradually increases. Moreover, the voltage difference VAB between the voltage A and the voltage B gradually increases from the negative value of the DC input voltage Vin. The voltage difference VAB between the voltage A and the voltage B satisfies the following equation (16):

$$\begin{cases} VAB(t) = -IL(0) \cdot \omega \cdot L \cdot \sin(\omega \cdot t) + (VAB(0) - Vo) \cdot \cos(\omega \cdot t) + Vo \\ VAB(t) = (-V_{in} - V_o) \cdot \cos(\omega \cdot t) + Vo = Vin \end{cases} \quad (16)$$

$$\omega = 1/\sqrt{L \cdot C_{para}}$$

In the above equation (16), IL(0) is zero, VAB(0) is equal to the negative value of the DC input voltage Vin, Cpara is a parasitic capacitance value of the full-bridge inverter circuit 1 (e.g., the junction capacitance of the switch element, the parasitic capacitance of the diode or the parasitic capacitance of the inductor), and L is an inductance value of the inductor L.

In the time interval between t4 and t5, the voltage difference VAB between the voltage A and the voltage B gradually increases to the DC input voltage Vin. At the time point t5, the voltage difference VAB between the voltage A and the voltage B is clamped. After the reverse charge process is completed, a reverse charge time period ΔT4 (i.e., the time interval between t4 and t5) satisfies the following equation (17):

$$\Delta T4 = \frac{\arccos\left(\frac{Vin - Vo}{Vin + Vo}\right)}{\omega} \quad (17)$$

Consequently, at the time point t5, the voltage difference VAB between the voltage A and the voltage B increases to the DC input voltage Vin. Meanwhile, the inductor current IL flowing through the inductor L satisfies the following equation (18):

$$IL(t) = -IL(0) \cdot \cos(\omega t) + \frac{VAB(0) - Vo}{\omega \cdot L} \cdot \sin(\omega \cdot t) \quad (18)$$

In the time interval between t5 and t6, the switch elements S1 and S4 are turned off, and the switch elements S2 and S3 are turned off. At the time point t5, the inductor current is IL(t5). In addition, the voltage difference VAB between the voltage A and the voltage B is increased to the DC input voltage Vin and clamped. Meanwhile, the switch elements S1 and S4 satisfy the zero-voltage switching condition. However, the inductor current IL flowing through the inductor L is not zero at this moment. If the switch elements S1 and S4 are turned on at this moment, the AC output voltage Vo and the output current To are readily shifted. For assuring that the full-bridge inverter circuit 1 is operated in the DCMB mode so as to be precisely controlled, the switch elements S1 and S4 are turned on after the inductor current IL is changed from the negative value to zero. At the time point t5, the voltage difference VAB between the voltage A and the voltage B is increased to the DC input voltage Vin. After the off state of the switch elements S1 and S4 is delayed for a delay time Tdelay', the switch elements S1 and S4 are turned on. Due to the delay time Tdelay', the resonance of the inductor L and the parasitic capacitor Cpara allows the inductor current IL to be changed from the negative value to zero. Moreover, the delay time Tdelay' satisfies the following equation (19):

$$Tdelay' = \frac{IL \cdot \sin(w \cdot \Delta T4)}{Vin - Vo} L \quad (19)$$

At the time point t6, the off state of the switch elements S1 and S4 is switched to the on state. After the time point t6, the operations of the switch elements S1, S2, S3 and S4 are similar to those from t1 to t6.

The operations of the full-bridge inverter circuit 1 by bipolar modulation have been described as above. In the stage A, the switch elements in each bridge arm are operated at a first switching frequency lower than the preset threshold frequency fmax'. In the stage D, the switching cycle Ts' satisfies the following equation (20):

$$Ts' = Ton + Toff + Tdead + \Delta T4 + Tdelay' \quad (20)$$

In the equation (20), Tdead is the dead time. The dead time Tdead can be previously determined.

From the above descriptions, the resonance of the inductor L and the parasitic capacitor Cpara occurs in the stage D. Consequently, the waveform of the inductor current in the stage D is different from the waveform of the inductor current in the stage A. The full-bridge inverter circuit 1 is operated in the CCM mode in the stage A, and the full-bridge inverter circuit 1 is operated in the DCMB mode in the stage D. In the stage A, the switching frequency of the switch element is lower than the preset threshold frequency. In the stage D, the full-bridge inverter circuit 1 is operated in the DCMB mode to realize the soft switch state. Moreover, the AC output voltage Vo is sampled by the control method of the present invention. As the AC output voltage Vo increases, the on time of the switch element increases. As the AC output voltage Vo decreases, the off time of the switch element decreases.

The operations of the full-bridge inverter circuit 1 during the negative half cycle of the AC output voltage Vo are similar to the operations of the full-bridge inverter circuit 1 during the positive half cycle of the AC output voltage Vo, and are not redundantly described herein.

Figure 14:
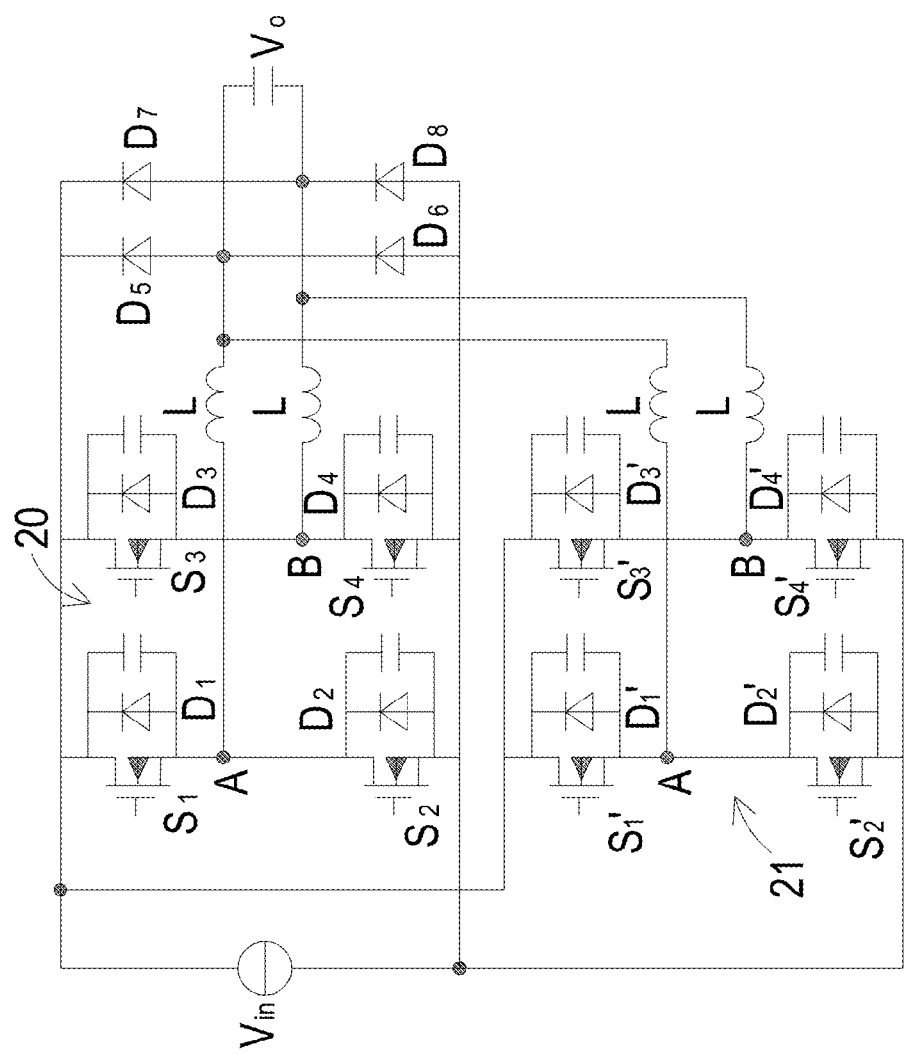
FIG. 14 is a schematic circuit diagram illustrating an interleaving inverter circuit using the control method of the present invention.

It is noted that the control method of the present invention is not restricted to the full-bridge inverter circuit 1. For example, the control method of the present invention can be applied to an interleaving inverter circuit. FIG. 14 is a schematic circuit diagram illustrating an interleaving inverter circuit using the control method of the present invention. As shown in FIG. 14, the interleaving inverter circuit 2 comprises a first full-bridge circuit 20, a second full-bridge circuit 21, plural inductors L and plural antiparallel diodes D5~D8. A first bridge arm of the first full-bridge circuit 20 comprises two switch elements S1 and S2, which are connected with each other in series. A second bridge arm of the first full-bridge circuit 20 comprises two switch elements S3 and S4, which are connected with each other in series. The switch elements S1, S2, S3 and S4 have respective body diodes D1, D2, D3 and D4. A first bridge arm of the second full-bridge circuit 21 comprises two switch elements S1' and S2', which are connected with each other in series. A second bridge arm of the second full-bridge circuit 21 comprises two switch elements S3' and S4', which are connected with each other in series. The switch elements S1', S2', S3' and S4' have respective body diodes D1', D2', D3' and D4'. The node A between the switch elements S1 and S2 of the first bridge arm of the first full-bridge circuit 20 are connected with a first end of the corresponding inductor L. The node B between the switch elements S3 and S4 of the second bridge arm of the first full-bridge circuit 20 are connected with a first end of the corresponding inductor L. The node A between the switch elements S1' and S2' of the first bridge arm of the second full-bridge circuit 21 are connected with a first end of the corresponding inductor L. The node B between the switch elements S3' and S4' of the second bridge arm of the second full-bridge circuit 21 are connected with a first end of the corresponding inductor L. The plural antiparallel diodes D5~D8 are electrically connected with the output terminal of the interleaving inverter circuit 2 and connected with the second ends of the corresponding inductors L. The control method of the present invention can be used to control the switch elements of the first full-bridge circuit 20 and the second full-bridge circuit 21 at high switching frequencies.

Figure 15:
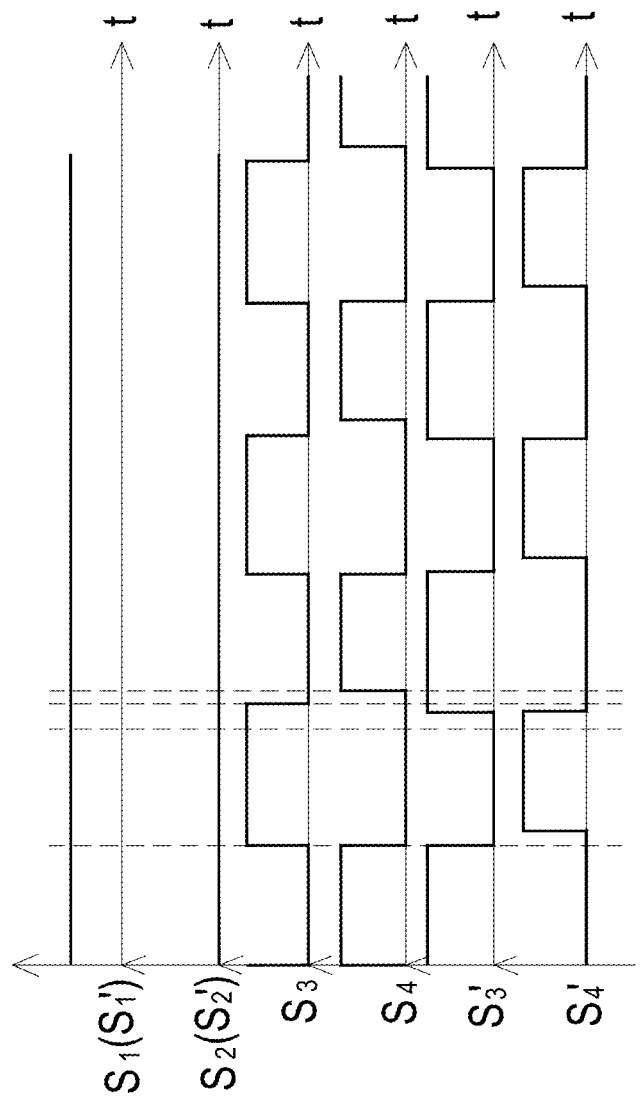
FIG. 15 is a schematic waveform diagram illustrating associated signals processed by the interleaving inverter circuit of FIG. 14.

FIG. 15 is a schematic waveform diagram illustrating associated signals processed by the interleaving inverter circuit of FIG. 14. The first full-bridge circuit 20 and the second full-bridge circuit 21 are operated in an interleaving manner at a phase difference of 180 degrees. The operations of each of the first full-bridge circuit 20 and the second full-bridge circuit 21 are similar to those of the full-bridge inverter circuit 1 of FIG. 1. That is, each of the first full-bridge circuit 20 and the second full-bridge circuit 21 can be controlled by unipolar modulation or bipolar modulation. By unipolar modulation, the first full-bridge circuit 20 and the second full-bridge circuit 21 are operated in the stages A, B and C. By bipolar modulation, the first full-bridge circuit 20 and the second full-bridge circuit 21 are operated in the stages A and D. The interleaving inverter circuit 2 can increase the overall loading capability. Moreover, the possibility of outputting the sub-harmonic wave is reduced while increasing the efficiency. In other words, the interleaving inverter circuit 2 has enhanced output performance.

Figure 16:
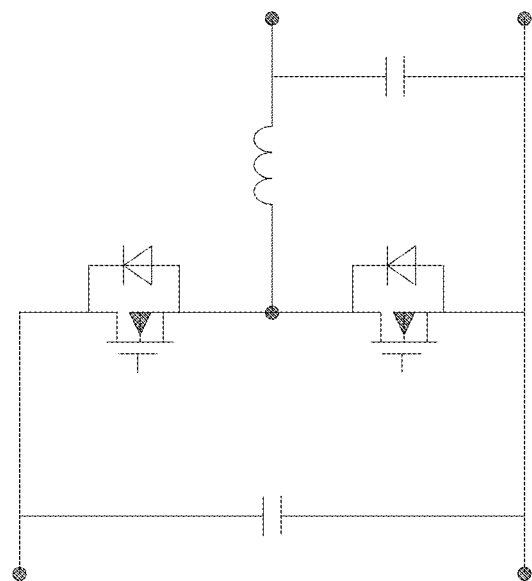
FIG. 16 is a schematic circuit diagram illustrating a single-phase half-bridge inverter circuit using the control method of the present invention.
Figure 17:
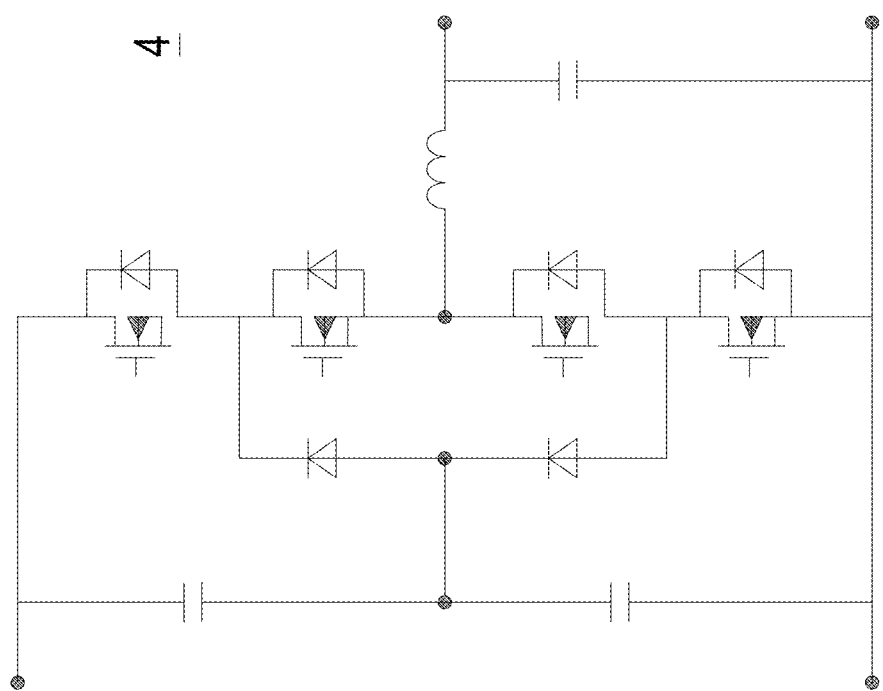
FIG. 17 is a schematic circuit diagram illustrating a single-phase three-level inverter circuit using the control method of the present invention.
Figure 18:
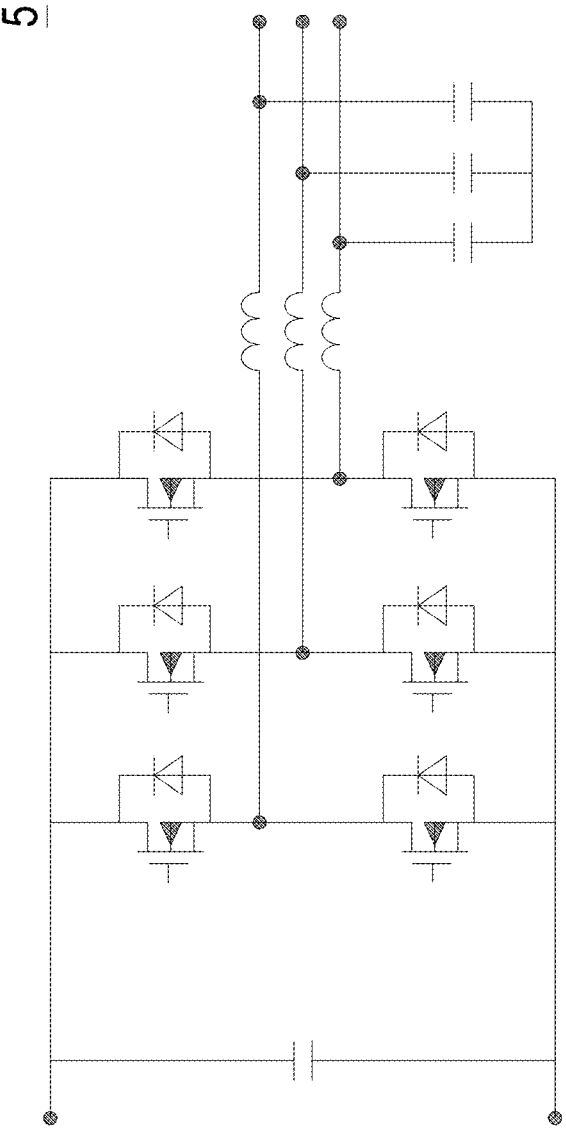
FIG. 18 is a schematic circuit diagram illustrating a three-phase full-bridge inverter circuit using the control method of the present invention.

Moreover, the control method of the present invention can be applied to a single-phase half-bridge inverter circuit 3 of FIG. 16, a single-phase three-level inverter circuit 4 of FIG. 17 or a three-phase full-bridge inverter circuit 5 of FIG. 18. The control method of the present invention can be used to control the switch elements of the single-phase half-bridge inverter circuit 3, the single-phase three-level inverter circuit 4 and the three-phase full-bridge inverter circuit 5 at high switching frequencies. However, the single-phase half-bridge inverter circuit 3, the single-phase three-level inverter circuit 4 or the three-phase full-bridge inverter circuit 5 is controlled by bipolar modulation. By bipolar modulation, the single-phase half-bridge inverter circuit 3, the single-phase three-level inverter circuit 4 or the three-phase full-bridge inverter circuit 5 is operated in the stages A and D. The circuitry of the single-phase half-bridge inverter circuit 3, the single-phase three-level inverter circuit 4 or the three-phase full-bridge inverter circuit 5 is not redundantly described herein.

From the above descriptions, the present invention provides a control method of an inverter circuit. During a half cycle of the AC output voltage, the upper switch element and the lower switch element of each bridge arm are operated at a first switching frequency in a first stage and operated at a second switching frequency in a second stage. In the first stage, the upper switch element and the lower switch element of the bridge arm are controlled to be operated at the first switching frequency lower than a preset threshold frequency in the first stage. Consequently, the turn-on loss and the turn-off loss of the switch elements are decreased, and the inverter circuit is operated in the CCM mode. In the second stage, the upper switch element or the lower switch element of the bridge arm are controlled to be operated at the second switching frequency. Consequently, the inverter circuit is operated in the DCMB mode. Since the switch elements are operated in the soft switch state, the problem of generating the hard switching loss by the conventional control method will be overcome.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for controlling an inverter circuit, the inverter circuit comprising at least one bridge arm, an inductor and a parasitic capacitor, the bridge arm comprising an upper switch element and a lower switch element connected in series, the upper switch element and the lower switch element being alternately turned on and turned off to convert a DC input voltage to an AC output voltage, the control method comprising steps of:
    dividing a half cycle of the AC output voltage into a first stage and a second stage;
    controlling the upper switch element and the lower switch element of the bridge arm to be operated at a first switching frequency lower than a preset threshold frequency in the first stage, so that the inverter circuit is operated in a continuous current mode; and
    controlling the upper switch element and the lower switch element of the bridge arm to be operated at a second switching frequency in the second stage, so that the upper switch element and the lower switch element are turned on at a preset voltage level and the inverter circuit is operated at a discontinuous current mode boundary mode.

2. The control method according to claim 1, wherein the first stage corresponds to a head region and a tail region of the half cycle of the AC output voltage.

3. The control method according to claim 2, wherein if the inverter circuit is controlled by bipolar modulation, the second stage corresponds to a remaining region of the half cycle of the AC output voltage excluding the head region and the tail region.

4. The control method according to claim 1, wherein the second switching frequency is lower than the first switching frequency.

5. The control method according to claim 1, wherein if the inverter circuit is controlled by unipolar modulation, the second stage comprises a stage B and a stage C, wherein the AC output voltage is smaller than one half of the DC input voltage in the stage B, and the AC output voltage is higher than or equal to one half of the DC input voltage in the stage C.

6. The control method according to claim 5, wherein in the stage B, an on state of one of the upper switch element and the lower switch element is extended for a first set time, so that the other one of the upper switch element and the lower switch element is turned on at the preset voltage level according to resonance of the inductor and the parasitic capacitor.

7. The control method according to claim 1, wherein as the AC output voltage increases, the second switching frequency in the second stage decreases.

8. The control method according to claim 7, wherein as the AC output voltage increases, an on time of the upper switch element or the lower switch element in the second stage increases.

9. The control method according to claim 1, wherein as the AC output voltage decreases, the second switching frequency in the second stage increases.

10. The control method according to claim 9, wherein as the AC output voltage decreases, an on time of the upper switch element or the lower switch element in the second stage decreases.

11. The control method according to claim 1, wherein the first switching frequency in the first stage is fixed.

\* \* \* \* \*